United States Patent
Ch'ng et al.

(10) Patent No.: US 8,400,989 B2
(45) Date of Patent: Mar. 19, 2013

(54) ACTIVATING PRIVATE ACCESS POINTS FOR WIRELESS NETWORKING

(75) Inventors: Shi Baw Ch'ng, North Billerica, MA (US); Ambika Pajjuri, Sunnyvale, CA (US)

(73) Assignee: Airvana LLC, Chelmsford, MA (US)

( * ) Notice: Subject to any disclaimer, the term of this patent is extended or adjusted under 35 U.S.C. 154(b) by 935 days.

(21) Appl. No.: 11/735,107

(22) Filed: Apr. 13, 2007

(65) Prior Publication Data

US 2008/0253550 A1 Oct. 16, 2008

(51) Int. Cl.
*H04W 4/00* (2009.01)

(52) U.S. Cl. ....... 370/338; 455/406; 455/41.2; 455/466; 455/560; 379/114.27

(58) Field of Classification Search ............. 379/207.13; 455/405, 410, 411, 414.2, 418, 419, 435.1, 455/444, 466, 558, 553.1–555, 426.1, 426.2, 455/406–408, 423–425, 41.2; 370/315, 328, 370/338; 709/223, 231
See application file for complete search history.

(56) References Cited

U.S. PATENT DOCUMENTS

| | | | |
|---|---|---|---|
| 5,729,597 A * | 3/1998 | Bhusri | 379/114.14 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,961,330 B1 * | 11/2005 | Cattan et al. | 370/352 |
| 7,170,871 B2 | 1/2007 | Eyuboglu et al. | |
| 7,200,391 B2 | 4/2007 | Chung et al. | |
| 7,213,766 B2 * | 5/2007 | Ryan et al. | 235/492 |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,762,470 B2 * | 7/2010 | Finn et al. | 235/492 |
| 7,933,619 B2 * | 4/2011 | Kim | 455/515 |
| 8,060,058 B2 * | 11/2011 | Ch'ng et al. | 455/411 |
| 8,068,450 B2 * | 11/2011 | Kozisek | 370/328 |
| 8,155,670 B2 * | 4/2012 | Fullam et al. | 455/456.3 |
| 8,184,603 B2 * | 5/2012 | Waylett et al. | 370/338 |
| 8,223,717 B2 * | 7/2012 | Dillon et al. | 370/331 |
| 2002/0196749 A1 | 12/2002 | Eyuboglu et al. | |
| 2003/0100311 A1 | 5/2003 | Chung et al. | |

(Continued)

FOREIGN PATENT DOCUMENTS

GB 2452688 3/2009

OTHER PUBLICATIONS

Dornan, Andy; "The Essential Guide to Wireless Communications Applications", 2nd Edition, Copyright 2001, pp. 94-95, accessed online on Dec. 4, 2009 at http://proquest.safaribooksonline.com/0-13-031716-0/.*

(Continued)

*Primary Examiner* — Sharad Rampuria
(74) *Attorney, Agent, or Firm* — Fish & Richardson P.C.

(57) ABSTRACT

A unique identifier is associated with a personal access point. The personal access point is distributed to an end user, who sends a text message including the identifier. Within an automated computer system, the text message is received, a billing account is associated with the personal access point on the basis of the text message, and the personal access point is activated to provide wireless access to a network.

29 Claims, 5 Drawing Sheets

U.S. PATENT DOCUMENTS

| | | | |
|---|---|---|---|
| 2004/0137890 A1* | 7/2004 | Kalke | 455/418 |
| 2005/0026650 A1* | 2/2005 | Russell | 455/554.1 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0035631 A1* | 2/2006 | White et al. | 455/418 |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Raman et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2008/0254833 A1* | 10/2008 | Keevill et al. | 455/558 |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0116445 A1 | 5/2009 | Samar et al. | |
| 2009/0154447 A1 | 6/2009 | Humblet | |
| 2009/0156165 A1 | 6/2009 | Raghothaman et al. | |
| 2009/0156195 A1 | 6/2009 | Humblet | |
| 2009/0156218 A1 | 6/2009 | Garg et al. | |
| 2009/0163202 A1 | 6/2009 | Humblet et al. | |
| 2009/0163216 A1 | 6/2009 | Hoang et al. | |
| 2009/0163238 A1 | 6/2009 | Rao et al. | |
| 2009/0164547 A1* | 6/2009 | Ch'ng et al. | 709/201 |
| 2009/0168766 A1 | 7/2009 | Eyuboglu et al. | |
| 2009/0168788 A1 | 7/2009 | Den et al. | |
| 2009/0170440 A1 | 7/2009 | Eyuboglu et al. | |
| 2009/0170475 A1 | 7/2009 | Ch'Ng et al. | |
| 2009/0170520 A1 | 7/2009 | Jones | |
| 2009/0170547 A1 | 7/2009 | Raghothaman et al. | |
| 2009/0172169 A1 | 7/2009 | Ch'Ng et al. | |
| 2009/0172397 A1 | 7/2009 | Kim | |
| 2009/0186626 A1 | 7/2009 | Raghothaman et al. | |
| 2010/0135266 A1* | 6/2010 | Karaoguz et al. | 370/338 |
| 2011/0125743 A1* | 5/2011 | Immonen et al. | 707/737 |

OTHER PUBLICATIONS

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.50024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

* cited by examiner

ACTIVATING PRIVATE ACCESS POINTS FOR WIRELESS NETWORKING

BACKGROUND

This disclosure relates to activating private access points for wireless networking.

Figure 1:
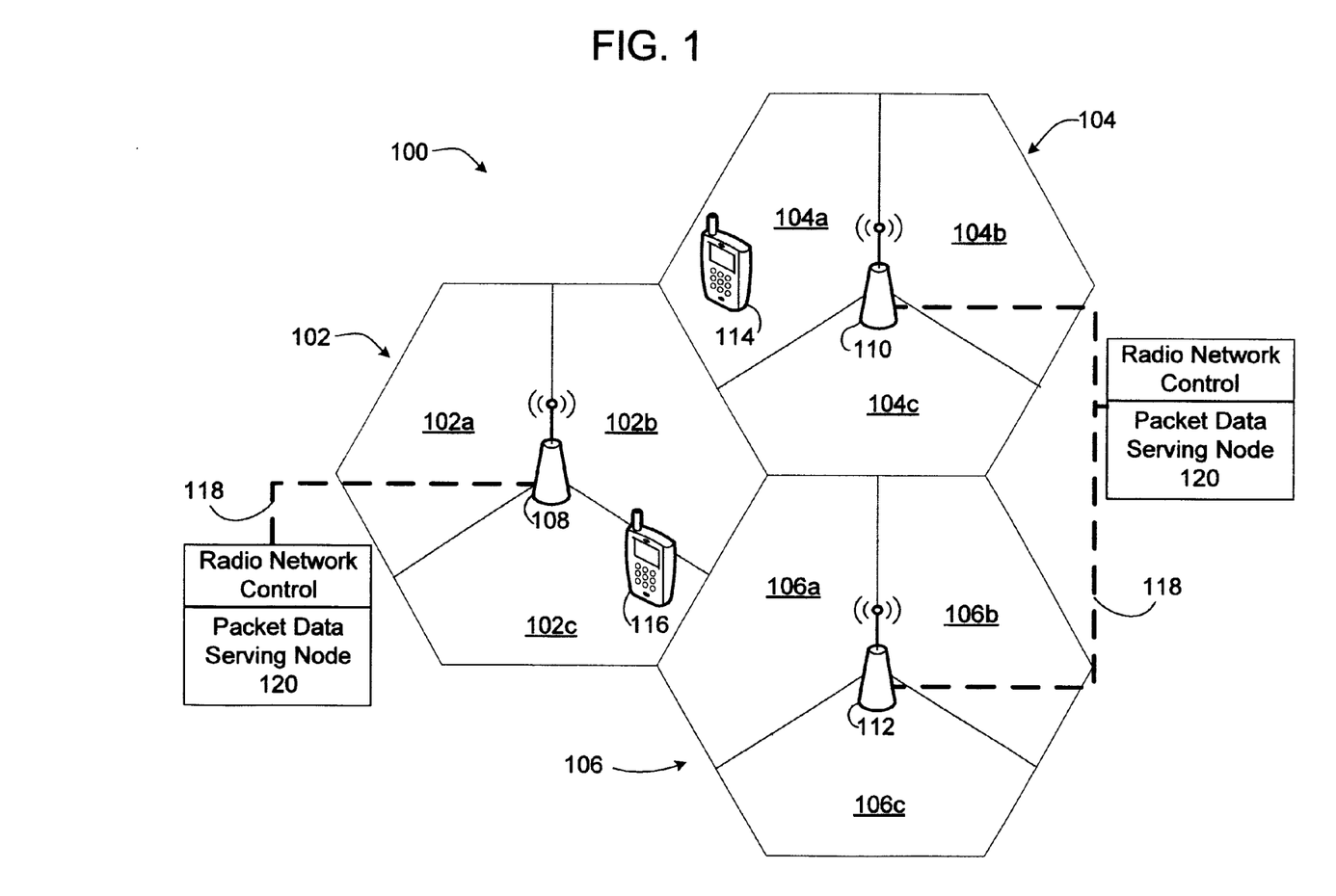
FIG. 1 is a block diagram of a radio access network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs) located in the cell. Each cell is often further divided into sectors 102a-c, 104a-c, 106a-c by using multiple sectorized antennas. A BTS is identified by one or more of several properties, which may include the phase offset of its pilot signal (PN offset), a frequency, an IP address, or a SectorID. In each cell, that cell's radio network access point may serve one or more sectors and may communicate with multiple access terminals in its cell.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication protocols may also be used.

SUMMARY

In general, in one aspect, a text message identifies a personal access point and requests that the personal access point be activated. A billing account is associated with the personal access point. The personal access point is activated to provide wireless access to a network.

Implementations may include one or more of the following features.

The billing account includes an account associated with a source of the text message. Associating the billing account with the personal access point includes determining a phone number associated with a source of the text message and causing a billing account associated with the phone number to be charged for use of the personal access point. Associating the billing account with the personal access point includes transmitting a second text message to a source of the received message including a request for billing information and receiving a third text message including billing information. Associating the billing account with the personal access point includes authenticating a source of the text message. Authenticating a source of the text message includes sending a challenge message to a purported source of the text message and receiving a correct response. Authenticating a source of the text message includes generating a token, transmitting a second text message including the token to a purported source of the first text message, and receiving a third text message from the purported source and including information based on the token. The information based on the token includes the token. The information based on the token includes a second token corresponding to the result of performing a mathematical operation on the first token.

Associating the billing account with the personal access point includes transmitting a second text message to a source of the received test message including a request for billing information and receiving a third text message including billing information. Receiving the text message includes receiving a text message including an identifier previously associated with the personal access point. Associating a location with the personal access point. Associating a location with the personal access point includes determining a location associated with a device used to send the first text message and using the location associated with the device as the location of the personal access point. Determining the location associated with the device includes receiving an identification of a geographic location of the device as determined by geographic location-determining capabilities of the device. Receiving the identification of the geographic location of the device includes causing the device to request permission of its operator to share information describing its geographic location, and causing the device to transmit the identification of its geographic location. Determining the location associated with the device includes receiving an identification of a geographic location of the device as determined by components of a wireless network in communication with the device. Determining the location associated with the device includes determining a postal address associated with the device. Associating a location with the personal access point includes transmitting a text message including a request for a user to provide the location to a device used to send the first text message and receiving a text message including an identification of the location of the personal access point. Associating a location with the personal access point includes determining a location of a device used to send the first text message, transmitting a text message including an identification of the location of the device to the device, and receiving a text message confirming the location of the device as the location of the personal access point.

In general, in one aspect, a unique identifier is associated with a personal access point, the personal access point is distributed to an end user, and within an automated computer system, a text message is received including the unique identifier, a billing account is associated with the personal access point on the basis of the text message, and the personal access point is activated to provide wireless access to a network.

In general, in one aspect, an access point has associated with it a unique identifier and is configured to be activated by a component of a radio access network in response to the component receiving a text message including the unique identifier.

Advantages include providing a simplified process for activating a personal access point by allowing a user to simply send a text message including the access point's unique identification. Billing and location information can be associated with the access point using existing capabilities of the network.

Other aspects may include these and other features and aspects, alone and in other combinations, expressed as apparatus, methods, program products, means for performing functions, and systems, and in other ways.

Other features and advantages will be apparent from the description and the claims.

DESCRIPTION

Referring to FIG. 1, a radio access network (RAN) 100 uses an Ev-DO protocol to transmit data packets between an access terminal, e.g., access terminal 114 and 116, and a radio network access point, e.g., access points 108, 110, 112. The access points are connected over a backhaul connection 118 to radio network control/packet data serving nodes (RNC/PDSN) 120, which may be one or more physical devices at different locations. Although this description uses terminology from EV-DO standards, the same concepts are applicable to other communication methods, including GSM, UMTS, HSDPA, WiMax, WiBro, WiFi, and the like.

Figure 2:
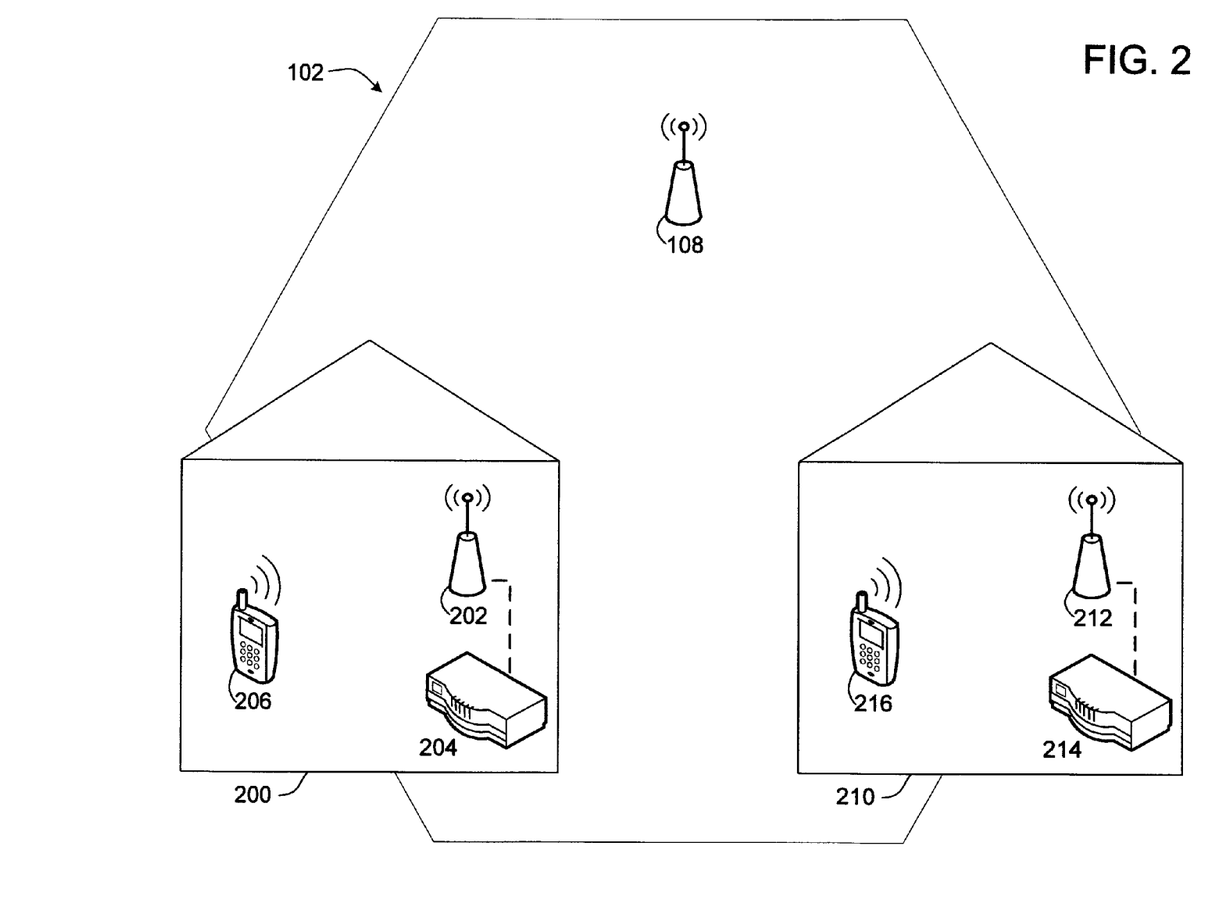
FIG. 2 is a block diagram of a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as DSL or cable modem 204, as the backhaul with the RNC/PDSN functionality implemented in the private access point 202. Such a private access point may be installed anywhere that it is advantageous to do so, for example, in an office, a public space, or a restaurant. When this description refers to a private access point being in a "home," that encompasses any such location. One respect in which a private access point may be considered different from a picocell access point is that the private access point may be intended to provide access only for the user who installs it in his home or those he authorizes, while a picocell may serve a similar venue but provide access to any subscriber of the network. In some examples, a private access point may be integrated into a cable modem or other network hardware, such as a router or WiFi access point.

When an authorized access terminal 206 is present inside the home (or anywhere within range of the private access point 202), it may use the private access point 202 rather than a regular cellular radio network access point such as access point 108 to place or receive voice calls and data connections, even if the access terminal is otherwise within the cell 102 for that access point 108. We sometimes refer to the standard access point 108 as a macro access point or macro BTS to distinguish it from a private access point, as it provides direct access to the wider RAN.

A neighboring home 210 may have its own private access point 212 connected to its cable modem 214 for use by its owner's access terminal 216. One respect in which a private access point deployment may be different from traditional radio network deployment is that neighboring private access points are intended to operate independently, in part because real-time communications is difficult between neighboring private access points. One respect in which the intended private access point deployment may also be different from a WiFi deployment is that private access points are intended to operate in a licensed spectrum. Some details and examples are discussed in co-pending application Ser. No. 11/640,501, titled Provisioning Private Access Points for Wireless Networking, and Ser. No. 11/640,503, titled Configuring Preferred User Zone Lists for Private Access Points for Wireless Networking, both filed Dec. 15, 2006, and incorporated here by reference.

When a user obtains a private access point (for example, buys one at a retail store) and is ready to put it to use, it may be necessary to activate the access point so that the network to which it will provide access is aware of it and will allow it to provide other devices with access to the network. Activating may include allocating a network address to the access point, adding it to access control lists, providing it with network configuration information, and other steps to allow the access point to connect access terminals to the network. It may also be necessary to associate billing information with the access point, so that users may be charged (or credited, depending on the business model) for using the personal access point to connect to the network. Both the allocating of a network address and the associating of billing information (as well as other user information required or useful to set up the private access point for operation) may be accomplished by text messaging using the system described below. Using text messages, such as SMS (simple message system) messages, provides the user with a familiar and easy-to-use interface that can be used immediately upon connecting the private access point to the home network. In some cases, it can be used to activate the access point even before it is connected.

Figure 3:
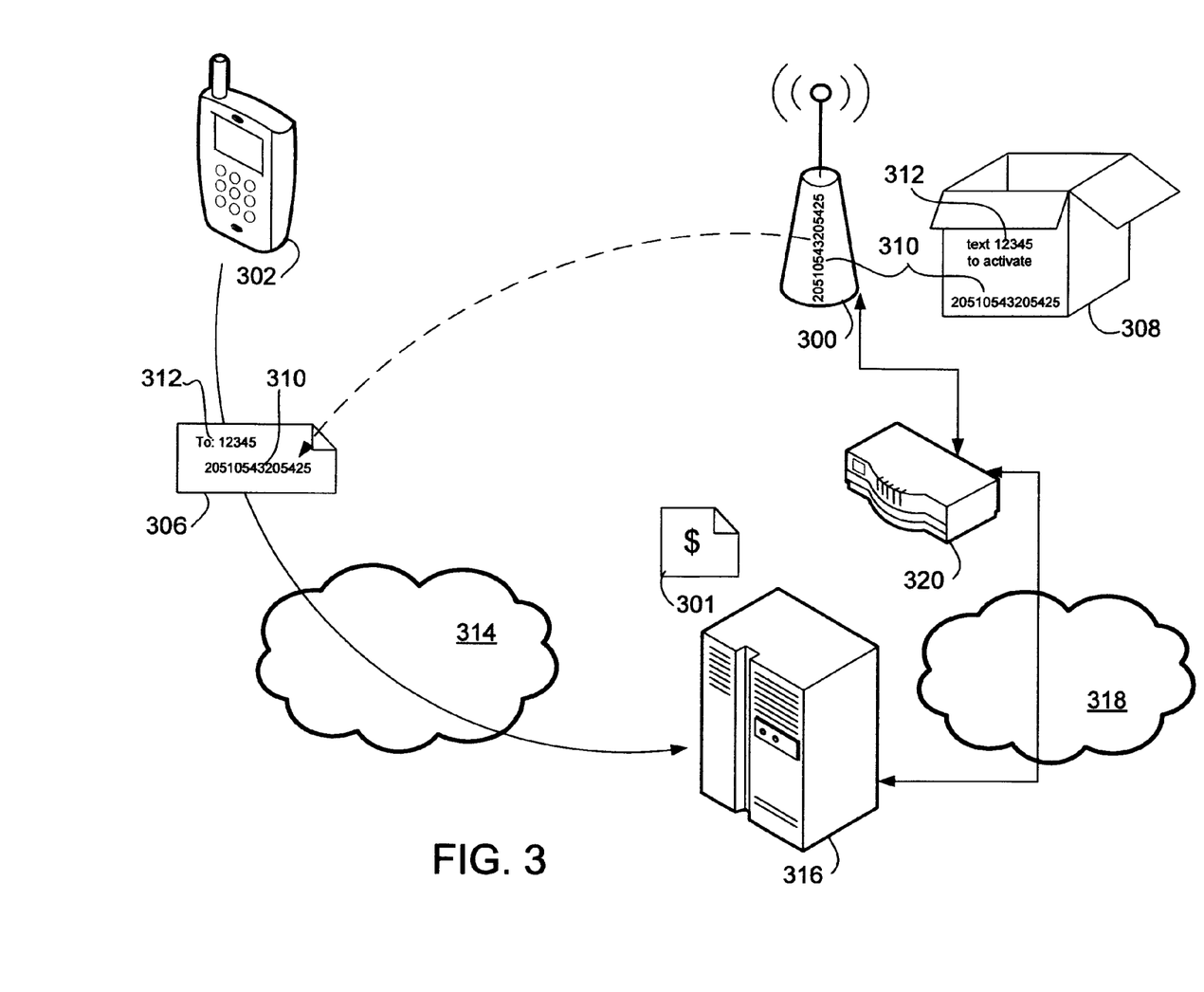
FIGS. 3 and 5 are block diagrams of home network configuration systems.

As shown in FIG. 3, a personal access point 300 includes a unique ID number 310, such as a serial number or a network interface MAC address or any other number or value that uniquely identifies the access point. This number may be printed on either or both of the access point 300 or its packaging 308 or made available to a user in any other way.

To activate the access point 300, the user of an access terminal 302 sends a text message 306 including the ID number 310 to a designated address 312 (e.g., a telephone number accessible through the normal cellular telephone text messaging system), which may also be marked on the access point 300 or its packaging 308 or made available to the user in another way. The text message goes through the wireless network 314 and ultimately reaches an activation server 316. The access point 300 is connected to the activation server 316 through the Internet 318 or other network by way of a cable modem 320 or other network gateway. A number of different devices or computer systems making up and operating the wireless network 314 may be involved in the process, but only the activation server 316 is shown for simplicity. When we refer to the activation server 316 taking action, the action may in practice be performed by any of these other devices or systems or a combination of them.

Figure 4:
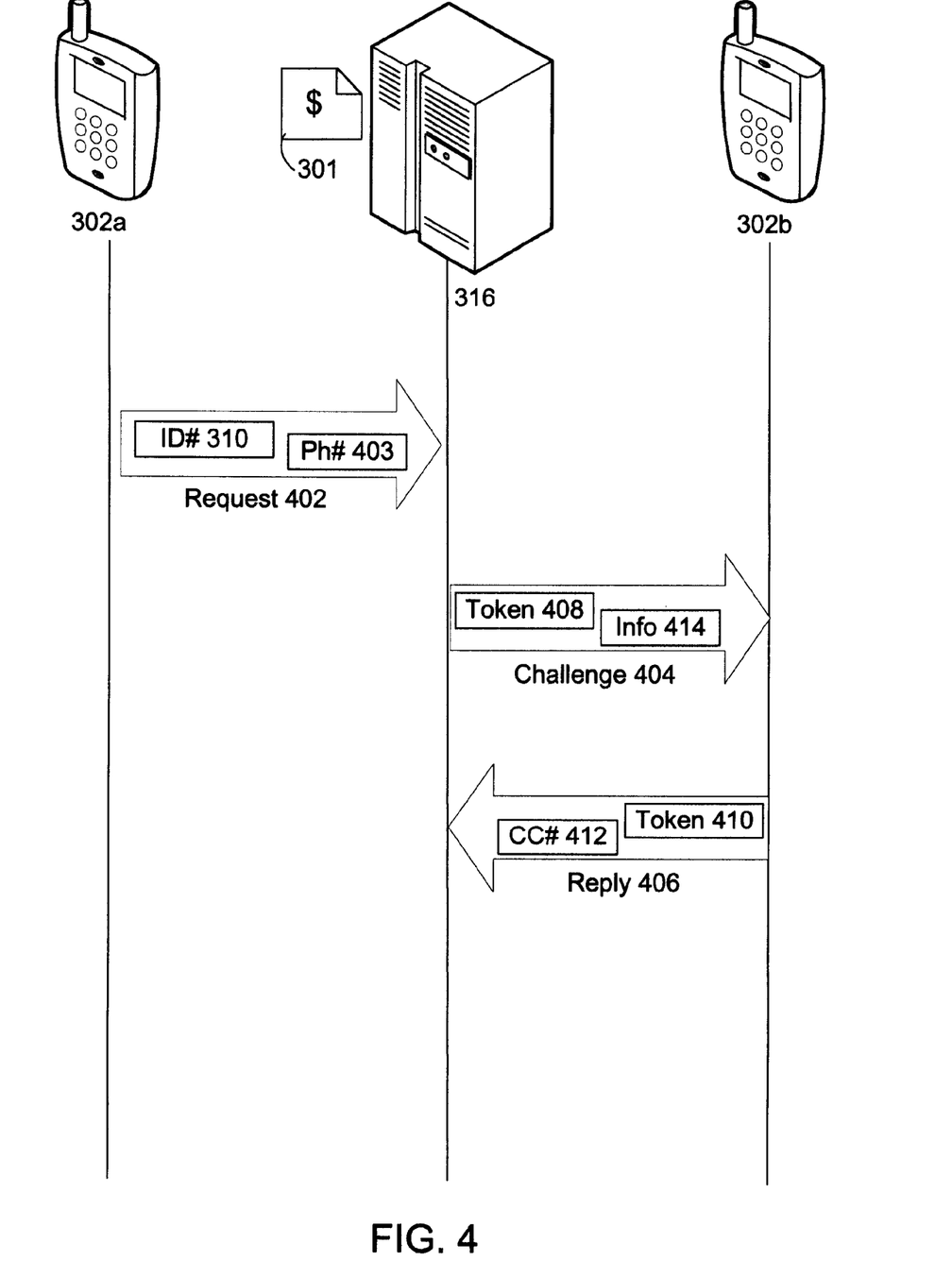
FIG. 4 is a sequence diagram for a configuration system.

In some examples, the activation server 316 associates billing information for the access point 300 with existing billing information 301 for whichever access terminal 302 was used to send the text message 306. If the network imposes charges for the use of the access point, the charges can be added to the phone bill for the access terminal 302. More sophisticated processes may be used as shown in FIG. 4 to prevent fraud and to allow various other billing arrangements. In some examples, the billing information can be associated with other devices or services for which the user is billed by the network carrier or other parties. "Billing information" may include the name and address of the person to be billed and other information typically used to permit the service provider to bill the user and collect the billed amount.

FIG. 4 shows two access terminals 302a and 302b communicating with the activation server 316. In some cases, the two access terminals are the same, single access terminal, and one purpose of the process is to confirm that fact. In the examples illustrated in FIG. 4, the first access terminal 302a is attempting to activate a personal access point. The first access terminal 302a is claiming to be the second access terminal 302b, and is requesting that charges for the access point be applied to the account of the second access terminal 302b. The activation server 316 will confirm that the first access terminal 302a and the second access terminal 302b are one and the same access terminal.

To begin, the first access terminal 302a sends an activation request 402 including the ID number 310 of the personal base station to the activation server 316. The request 402 appears, to the activation server 316, to have originated from the second access terminal 302b. This may be because the request includes an indication 403 of the sending terminal's phone number, and the first access terminal 302a has caused that indication 403 to use the phone number of the second access terminal 302b. In response, the activation server 316 sends a challenge 404 to the second access terminal 302b. To complete the activation, the second access terminal 302b must send a reply 406, confirming that it does indeed want the access point to be activated and associated with the account of the second access terminal.

In some examples, the challenge 404 includes a token 408 generated by the activation server, and the reply 406 must include the token or some mathematical modification of it 410 to prove that the reply was sent by the same access terminal that received the challenge 404 (e.g., to prevent a fraudulent user from anticipating the challenge 404 and spoofing a reply.) Additional security measures may also be used, such as requiring that the reply 406 come from the same access terminal 302a that sent the original activation request 402 (for example, by comparing hardware addresses associated with messages to the billing records of the network operator), or imposing a time limit within which the reply 406 must be received. The request, challenge, and reply may all be expressed as text messages, such as SMS messages or emails, or may be other types of messages passed between access terminals and network components.

If the two terminals are in fact not the same terminal, and if the user of the second access terminal 302b does not want to activate the personal access point, he can ignore the challenge 404.

In some examples, the challenge also may give the user the opportunity to enter or modify the billing information 301, for example, by providing a credit card number 412 to charge instead of charging the user though his phone bill. The challenge 404 may also include additional information 414 such as terms of service, required legal notices, or links to such documents. This information might also be sent in a second message accompanying (or separate from) the challenge 404.

Once the reply 406 is received by the activation server and determined to satisfy any additional safeguards, the activation server 316 instructs the network to allow the access point to provide network access and provides the access point with whatever information it needs to operate. In some examples, the first access terminal 302a is not surreptitiously presenting itself as the second access terminal 302b but is openly requesting that the second access terminal 302b be charged. In some examples, a similar system to that illustrated in FIG. 4 can be used, without requiring that the reply 406 be received from the same access terminal that sent the original request 402.

Figure 5:
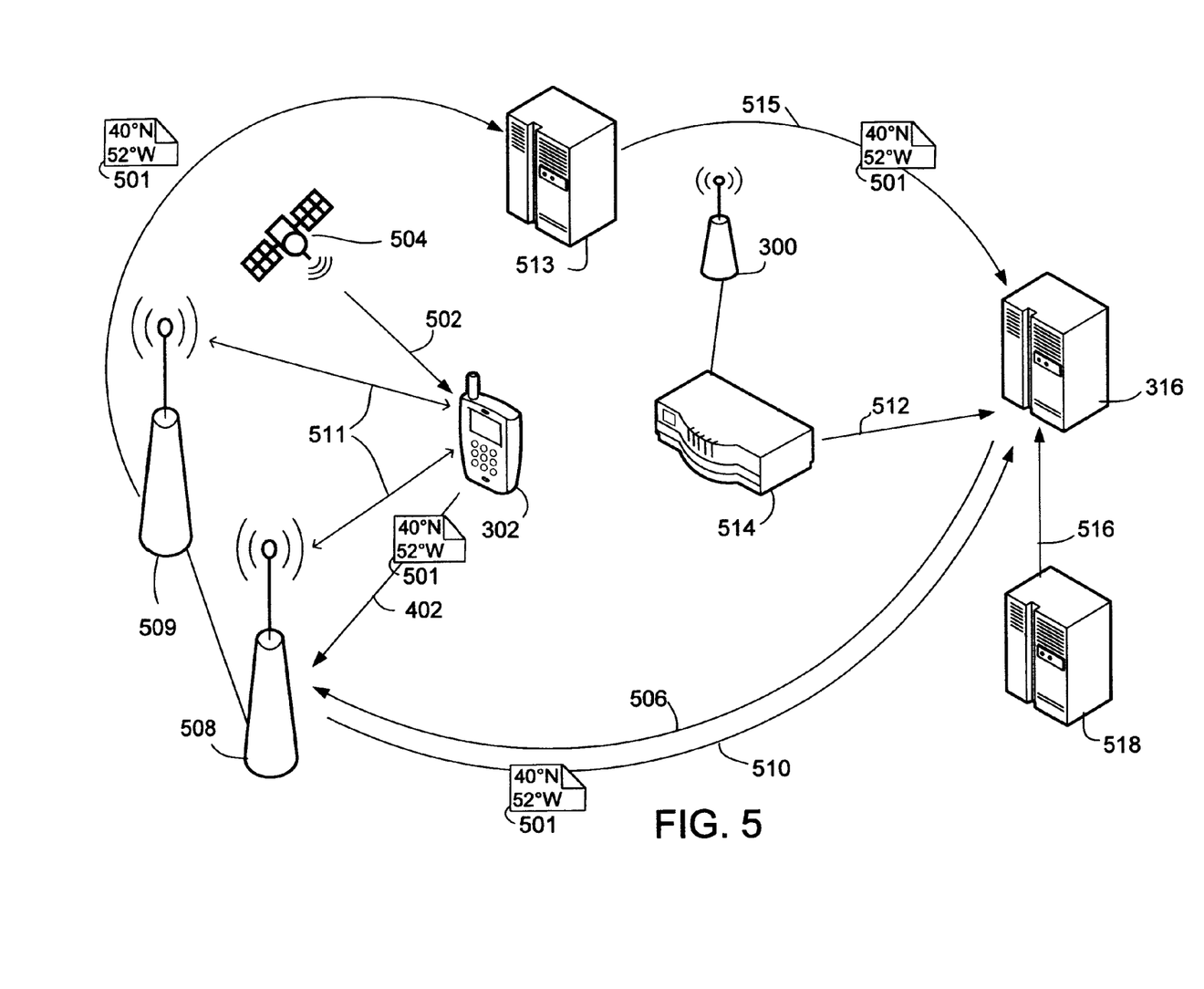

In some examples, a geographic location 501 is associated with the personal access point. This can allow location-based services such as E911 and local point-of-interest information for access terminals that use the personal access point and do not have built-in location-determining capabilities. A location can be associated with a personal access point as part of the activation process as shown in FIG. 5.

There are several sources of location information 501 available to the activation server 316. In some examples, the activation server 316 may assume that the personal access point 300 is at the same location as the access terminal 302 used to activate it. The access terminal 302 used to send the activation message may have GPS capabilities that determine its location 501 based on signals 502 from satellites 504. This information may be automatically included in the activation message 402 or the activation server 316 may request it in a reply message 506 to the access terminal 302. The macro access point 508 that the access terminal is using to communicate (prior to activation of the private access point 300) knows its own location and may provide it (510) to the activation server 316, which may infer that this is the location of the access terminal 302. Multiple macro base stations 508, 509 may be used to triangulate the location of the access terminal 302 based on the delay times of signals 511 sent between them. This information may be stored on another network component 513, for example, for use in E911 services, which may provide it to the activation server in a message 515. Before requesting the location of the access terminal 302 from the access terminal itself or the network infrastructure, the activation server 316 may request permission to do so in the reply message 506 to the access terminal 302.

Other sources of location information available to the activation server 316 may include the location 512 of the cable modem 514 or other network hardware used to connect the personal access point 300 to the network (assuming the access point has been set up) and billing information 516 available from the operator of the radio access network 518. In some examples, once the activation server 316 has established a likely location of the personal access point 300, it sends a confirmation message 333 to the user of the access terminal 302 to confirm or correct the information. In some examples, the activation server 316 asks the user of the access terminal 302 for the location in the first place.

Although the techniques described above employ the 1xEV-DO air interface standard, the techniques are also applicable to other CDMA and non-CDMA air interface technologies in which messaging can be used to communicate information.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims and other claims to which the applicant may be entitled. The following are examples for illustration only and do not limit the alternatives in any way. The techniques described herein can be performed in a different order and still achieve desirable results.

What is claimed is:

1. A method performed in one or more network devices in communication with a radio access network, the method comprising:
   receiving, from an access terminal, a text message that identifies a personal access point and that requests that the personal access point be activated, the text message comprising a short message service (SMS) message;
   associating the personal access point with a billing account, the associating comprising:
      automatically identifying a phone number associated with the access terminal; and
      automatically associating, with the personal access point, a billing account associated with the phone number; and
   activating the personal access point to provide wireless access to a network after the personal access point has been associated with the billing account;
   wherein the personal access point is configured to provide one or more access terminals access to the radio access network after the personal access point has been activated.

2. The method of claim 1 in which the billing account comprises an account associated with a source of the text message.

3. The method of claim 1 in which associating the billing account with the personal access point comprises:
   determining a phone number associated with a source of the text message; and
   causing a billing account associated with the phone number to be charged for use of the personal access point.

4. The method of claim 1 in which associating the billing account with the personal access point comprises:
   transmitting a second text message to a source of the received text message, the second text message comprising a request for billing information; and
   receiving a third text message comprising billing information.

5. The method of claim 1 in which associating the billing account with the personal access point comprises authenticating a source of the text message.

6. The method of claim 5 in which authenticating a source of the text message comprises:
   sending a challenge message to a purported source of the text message; and
   receiving a correct response.

7. The method of claim 5 in which the text message is a first text message and in which authenticating a source of the text message comprises:
   generating a token;
   transmitting a second text message comprising the token to a purported source of the first text message; and
   receiving a third text message from the purported source and comprising information based on the token.

8. The method of claim 7 in which the information based on the token comprises the token.

9. The method of claim 7 in which the information based on the token comprises a second token corresponding to the result of performing a mathematical operation on the first token.

10. The method of claim 1 in which receiving the text message comprises receiving a text message comprising an identifier previously associated with the personal access point.

11. The method of claim 1 also comprising associating a location with the personal access point.

12. The method of claim 11 in which associating a location with the personal access point comprises:
   determining a location associated with a device used to send the first text message; and
   using the location associated with the device as the location of the personal access point.

13. The method of claim 12 in which determining the location associated with the device comprises:
   receiving an identification of a geographic location of the device as determined by geographic location-determining capabilities of the device.

14. The method of claim 13 in which receiving the identification of the geographic location of the device comprises:
   causing the device to request permission of its operator to share information describing its geographic location; and
   causing the device to transmit the identification of its geographic location.

15. The method of claim 12 in which determining the location associated with the device comprises:
   receiving an identification of a geographic location of the device as determined by components of a wireless network in communication with the device.

16. The method of claim 12 in which determining the location associated with the device comprises:
   determining a postal address associated with the device.

17. The method of claim 11 in which associating a location with the personal access point comprises:
   transmitting a text message comprising a request for a user to provide the location to a device used to send the first text message; and
   receiving a text message including an identification of the location of the personal access point.

18. The method of claim 11 in which associating a location with the personal access point comprises:
   determining a location of a device used to send the first text message;
   transmitting a text message including an identification of the location of the device to the device; and
   receiving a text message confirming the location of the device as the location of the personal access point.

19. A system comprising:
   a computing device configured to access a radio access network, the computing device being configured to:
      in response to receiving a text message from an access terminal that comprises a short message service (SMS) message, that identifies a personal access point, and that requests that the personal access point be activated:
         associate the personal access point with a billing account, the associating comprising:
            automatically identifying a phone number associated with the access terminal; and
            automatically associating, with the personal access point, a billing account associated with the phone number; and
         activate the personal access point to provide wireless access to a network after the personal access point has been associated with the billing account;
      wherein the personal access point is configured to provide one or more access terminals access to the radio access network after the personal access point has been activated.

20. The system of claim 19 in which the computing device is configured to associate the billing account with the personal access point by:
   determining a phone number associated with a source of the text message; and
   causing a billing account associated with the phone number to be charged for use of the personal access point.

21. The system of claim 19 in which the computing device is configured to associate the billing account with the personal access point by authenticating a source of the text message.

22. The system of claim 21 in which the text message is a first text message and in which the computing device is configured to authenticate a source of the text message by:
   generating a token;
   transmitting a second text message comprising the token to a purported source of the first text message; and
   receiving a third text message from the purported source and comprising information based on the token.

23. The system of claim 19 in which the computing device is also configured to associate a location with the personal access point.

24. The system of claim 23 in which the computing device is configured to associate a location with the personal access point by:
   determining a location associated with a device used to send the first text message; and
   using the location associated with the device as the location of the personal access point.

25. A radio access network management system comprising:
   an interface for communicating with a personal access point;
   an interface for receiving a text message from an access terminal, the text message comprising a short message service (SMS) message and the text message requesting that the personal access point be activated; and
   a computing device configured to, in response to receiving the text message:
      associate the personal access point with a billing account, the associating comprising:
         automatically identifying a phone number associated with the access terminal; and
         automatically associating, with the personal access point, a billing account associated with the phone number; and
      activate the personal access point to provide wireless access to a network after the personal access point has been associated with the billing account;
   wherein the personal access point is configured to provide one or more access terminals access to the radio access network after the personal access point has been activated.

26. One or more computer storage devices comprising instructions that, when executed by one or more computing devices connected to a radio access network, cause the one or more computing devices to:
   in response to receiving a text message from an access terminal that comprises a short message service (SMS) message, that identifies a personal access point, and that requests that the personal access point be activated:
      associate the personal access point with a billing account, the associating comprising:
         automatically identifying a phone number associated with the access terminal; and
         automatically associating, with the personal access point, a billing account associated with the phone number; and
      activate the personal access point to provide wireless access to a network after the personal access point has been associated with the billing account;
   wherein the personal access point is configured to provide one or more access terminals access to the radio access network after the personal access point has been activated.

27. A system comprising:
   a personal access point comprising a unique identifier and being configured to be activated by a component of a radio access network in response to the component receiving a text message that comprises the unique identifier from an access terminal, the text message comprising a short message service (SMS) message and the text message causing the component to:

associate the personal access point with a billing account, the associating comprising:

automatically identifying a phone number associated with the access terminal; and automatically associating, with the personal access point, a billing account associated with the phone number;

wherein the personal access point is configured to provide one or more access terminals access to the radio access network after the personal access point has been activated.

28. The method of claim 1, wherein the personal access point comprises a portable radio network access point.

29. The method of claim 1, wherein the text message is addressed to a phone number associated with personal access point.

* * * * *